May 5, 1936.　　　　　A. L. MOORE　　　　2,039,436
SOUND REPRODUCTION DEVICE
Filed March 2, 1934
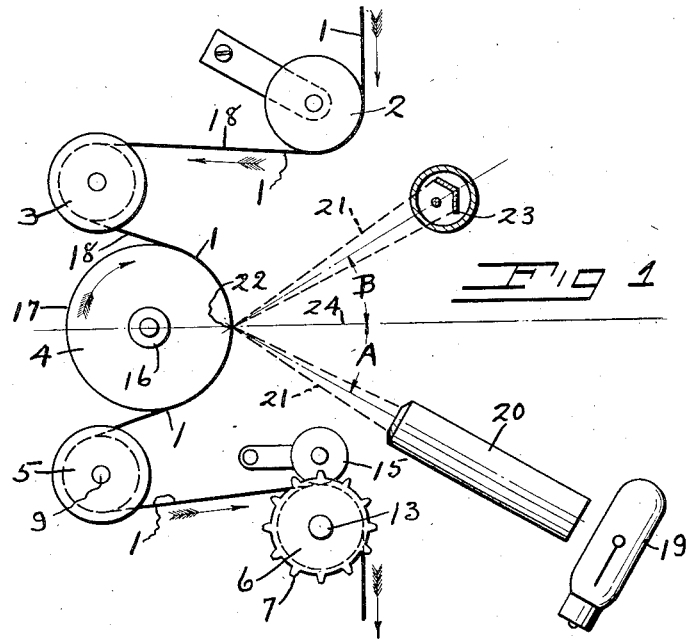
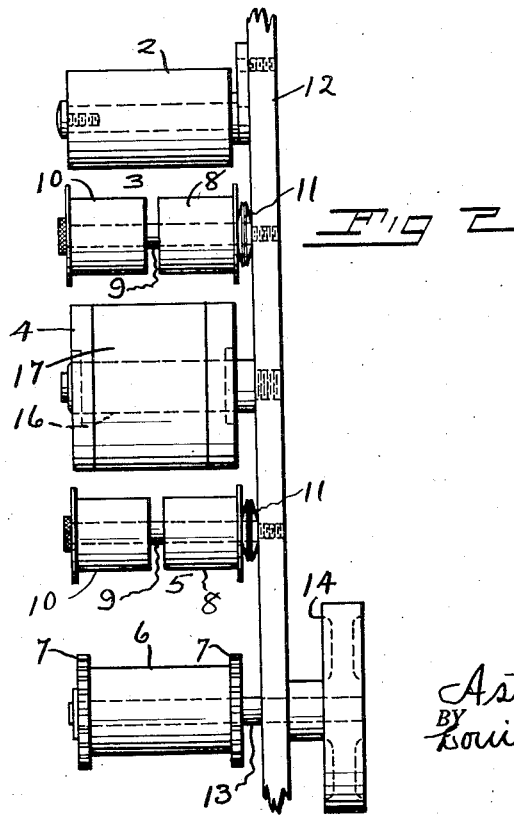
INVENTOR.
Aston L. Moore
BY Louis C. Vanderlip.
ATTORNEYS.

Patented May 5, 1936

2,039,436

UNITED STATES PATENT OFFICE 2,039,436

SOUND REPRODUCTION DEVICE

Aston L. Moore, South Bend, Ind., assignor of one-half to The Martin Band Instrument Co., Elkhart, Ind., a corporation of Indiana Application March 2, 1934, Serial No. 713,745

7 Claims. (Cl. 179—100.3)

This invention relates to sound reproducing devices, and particularly to the reproduction of sound waves by the use of linear phonogram carriers such as film strips, or the like.

In the reproduction of sound waves from a linear phonogram carrier, particularly musical sound waves, it is of the utmost importance that the carrier be moved at a uniform speed. And, as is well known, any irregular movement of the phonogram carrier, such as undulation, misalinement, or lateral deflection thereof, contributes materially to inefficient sound reproduction.

The principal object of my invention is to provide a device for the reproduction of sound waves by the use of linear phonogram carriers, such as film strips, by light reflection in combination with a photoelectric cell.

Another object of the invention is to provide a device for the reproduction of musical sound waves by the use of a linear phonogram film strip, or the like, by light reflection from a highly glossy, or polished surface of the film mount, wherein the light passes through the film to the glossy surface of the film mount and is reflected thereby to the photoelectric cell.

A third object is the method of reproducing sound waves from a linear phonogram carrier, or film strip, by moving the carrier past a highly glossy surface, then directing light through the film to the glossy surface from which the light is reflected to a photoelectric cell.

Another object is to provide a device of the character described in the foregoing objects in which means are provided for effecting a uniform speed movement of the film, or phonogram carrier, and for obviating irregular movements thereof.

Other and more specific objects of the invention are mentioned and described herein.

The invention is illustrated in the accompanying drawing, wherein

Figure 1 illustrates a side elevation of my improved sound reproducing apparatus; and Figure 2 illustrates an end elevational view of the phonogram carrier supporting and driving mechanism for my improved sound reproducing apparatus.

Similar numerals of reference indicate like parts throughout the several views on the drawing.

Referring now to the details of the drawing the numeral 1 indicates a flexible phonogram carrier element, which may be a strip of film bearing a photographic sound record of any suitable type, and preferably transparent to admit the ready passage of light therethrough.

The film strip 1, which is trained over and about a series of supporting, guide, and actuating rollers, may be initially contacted by a gravity roller 2 which may function as a pressure weight of its own inertia to provide tension of the film 1 at a guide roller 3. The film 1 passes over and from the guide roller 3 to and about the main mount roller 4, thence backward to and about a second guide roller 5 which guides the film to the driving roller 6, the latter having the driving sprockets 7 at opposite ends thereof as a means for receiving suitable power for moving the film 1 past a focal point on the roller 4, as hereinafter described.

Each of the guide rollers 3 and 5 is a flanged, two part element, providing guide flanges at the opposite ends thereof, of which, the flanged half section 8, together with half section 10, is carried on the bearing pin or shaft 9, the portion 8 being slidable on said shaft toward section 10 and urged by a light spring washer 11 seated against the bearing frame 12 with which the shaft 9 is connected. The roller 6 may be carried on a bearing shaft 13 which is journaled in the bracket 12, and a fly wheel 14 may be carried on the end of the shaft 13. An idler roller 15 may be incorporated in my device to maintain contact of the film 1 with the roller 6. It will be evident that, as the film is drawn over the guide rollers 3 and 5, it moves between the flanges of sections 8 and 10 of said rollers, and that the flange on section 8 of the roller unit is caused to lightly engage the edge of the film by the spring washer 11, thereby lightly pressing the opposite edge of the film into contact with the flange on section 10 of said roller unit, whereby lateral movement of the film is prevented.

The film mount roller 4, which is rotatably carried upon the shaft 16 which is connected with the bracket 12, is preferably a relatively heavy metal element and functions as its own impedence member to control the movement of the film 1 thereover, whereby buckling or undulations of the film is prevented when the latter is in motion. The outer periphery 17 of the roller 4 is made light reflective, in the maximum degree, and this may be accomplished by electroplating said outer periphery with nickel, or by plating same with chromium, and subsequently polishing the plating to impart a highly glossy finish thereto.

The emulsion side 18 of the film 1 has the photographic sound record formed thereon, and as said film is drawn over and about the roller 4, the sound record surface 18 of the film contacts directly with the glossy light reflective surface 17 for a substantial portion of the circumference of said roller.

The numeral 19 indicates a portion of an optical system of any desired, or suitable, construction, which, through the objective 20, directs a light beam 21 upon the film 1 tangentially of the roller 4, said light beam passing through the film to a focal point 22 on the reflective surface 17 of said roller, said light beam being thereby reflected through the film, tangentially of said roller, to the photoelectric cell 23. In the arrangement of the parts of my improved sound reproducing apparatus the objective 20 is necessarily arranged on one side of the perpendicular 24 and the photoelectric cell 23 on the other side of said perpendicular, whereby the angle A, of light projection of beam 21 is equal to the angle B of light reflection.

The particular embodiment of my invention, as illustrated in the drawing, has been selected as illustrative thereof, and it will be apparent that the same principle is applicable to other devices. It is also apparent that various modifications of my device may be effected without departing from the spirit and scope of my invention.

I claim:

1. In a phonographic apparatus in which the sound record is formed on an elongated transparent flexible carrier, the combination of a roller the outer circumferential periphery of which is provided with a light reflective surface and past which the sound record is moved with the record side of said carrier in contact with said light reflective surface, a photoelectric cell positioned to receive light reflected from said light reflective surface of said roller, and means for directing light through the sound record onto the light reflective surface of said roller whence it is reflected to said photoelectric cell.

2. In phonographic apparatus in which the sound record is formed on a flexible carrier provided with an emulsion side, the combination of a light reflective roller on which the sound record is supported with the emulsion side of the sound record in contact with said roller, means for advancing the sound record from one point to another point, a photoelectric cell positioned to receive light reflected from said light refractive roller, and means for directing light through the sound record onto said roller angularly in relation to the diameter of said roller whence the light is reflected through the sound record to the photoelectric cell.

3. In a phonographic apparatus in which the sound record is formed on a transparent elongated carrier, the combination of a rotary light reflective element past which the sound record is moved with the emulsion side of said record contacting said light reflective element, a photoelectric cell positioned to receive light reflected from said light reflective element, and means for directing light through the sound record onto said light reflective element whence it is reflected to said photoelectric cell.

4. In a phonographic apparatus in which the sound record is formed on a transparent elongated carrier, the combination of a rotary light reflective element past which the sound record is moved with the emulsion side of said record adjoining said light reflective element, a photoelectric cell positioned to receive light reflected from said light reflective element, and means for directing light through the sound record onto said light reflective element whence it is reflected to said photoelectric cell in a modulated beam of light.

5. In phonographic apparatus in which the sound record is formed on a transparent elongated carrier, the combination of a light reflective element past which the sound record is to be moved, means for moving said elongated carrier past said reflective element, a photoelectric cell positioned to receive light reflected from said reflective element, a lamp positioned for directing light at an oblique angle relatively to said sound record through said sound record onto said reflective element, whence it is reflected to said photoelectric cell.

6. In phonographic apparatus in which the sound record is formed on a transparent elongated carrier, the combination of a rotary light reflective element past which the sound record is to be moved, means for moving said elongated carrier past said light reflective element, a photoelectric cell positioned to receive light reflected from said reflective element, and a lamp for directing light at an oblique angle relatively to said sound record through said sound record onto the outer periphery of said rotary reflective element, whence it is reflected to said photoelectric cell.

7. In phonographic apparatus in which the sound record is formed on a transparent elongated carrier, the combination of a metallic light reflective element past which the sound record is to be moved, means for moving said elongated carrier past said light reflective element, a photoelectric cell positioned to receive light reflected from said reflective element, and a lamp for directing light at an oblique angle relatively to said sound record through said sound record onto said reflective element, whence it is reflected to said photoelectric cell.

ASTON L. MOORE.